United States Patent
Park

(10) Patent No.: US 10,604,376 B2
(45) Date of Patent: Mar. 31, 2020

(54) TV CABLE ORGANIZER

(71) Applicant: SPREEO, Seoul (KR)

(72) Inventor: Kwan Kyu Park, Seoul (KR)

(73) Assignee: SPREEO, Seoul (KR)

( * ) Notice: Subject to any disclaimer, the term of this patent is extended or adjusted under 35 U.S.C. 154(b) by 76 days.

(21) Appl. No.: 15/752,231

(22) PCT Filed: Mar. 13, 2017

(86) PCT No.: PCT/KR2017/002683
§ 371 (c)(1),
(2) Date: Feb. 12, 2018

(87) PCT Pub. No.: WO2017/160039
PCT Pub. Date: Sep. 21, 2017

(65) Prior Publication Data
US 2019/0071277 A1  Mar. 7, 2019

(30) Foreign Application Priority Data
Mar. 14, 2016 (KR) .................. 10-2016-0030122

(51) Int. Cl.
| B65H 75/20 | (2006.01) |
| H02G 3/00 | (2006.01) |
| B65H 75/44 | (2006.01) |
| B65H 75/36 | (2006.01) |

(52) U.S. Cl.
CPC ........... *B65H 75/20* (2013.01); *B65H 75/366* (2013.01); *B65H 75/446* (2013.01); *B65H 75/4476* (2013.01); *H02G 3/00* (2013.01); *B65H 2701/34* (2013.01)

(58) Field of Classification Search
CPC ........ B65H 75/20; B65H 75/04; B65H 75/18; B65H 75/54; B65H 75/446; B65H 2701/34; H02G 3/00
See application file for complete search history.

(56) References Cited

U.S. PATENT DOCUMENTS

| 5,819,894 | A  * | 10/1998 | Okamoto | B65H 75/04 191/12.4 |
| 6,170,784 | B1 * | 1/2001 | MacDonald | H05K 7/1448 211/26 |
| 6,607,169 | B1 * | 8/2003 | Gershfeld | A47B 21/06 211/60.1 |
| 7,098,406 | B1 * | 8/2006 | Hammonds | B65H 75/06 174/135 |
| 7,352,947 | B2 * | 4/2008 | Phung | G02B 6/4459 248/49 |
| 8,464,984 | B2 * | 6/2013 | Laursen | H02G 3/30 211/26 |

(Continued)

*Primary Examiner* — Anita M King
(74) *Attorney, Agent, or Firm* — Patent Office of Dr. Chung Park

(57) ABSTRACT

The present invention relates to a TV cable organizer and, particularly, to a TV cable organizer which comprises a pair of side frames formed apart from each other at a predetermined interval, connecting bars for horizontally connecting the side frames at predetermined intervals, and a power strip fastening panel fastened to the side frames, for fastening a power strip, and which can thus neatly wind and organize, behind a TV, electric cables such as power cables and signal cables of the TV and various peripheral devices connected to the TV.

9 Claims, 18 Drawing Sheets

(56) References Cited

U.S. PATENT DOCUMENTS

| | | | |
|---|---|---|---|
| 9,307,669 B1* | 4/2016 | Briggs | A47B 57/16 |
| 2009/0039212 A1 | 2/2009 | Whalen | |
| 2019/0071279 A1* | 3/2019 | Park | H02G 11/00 |
| 2019/0284014 A1* | 9/2019 | Pollock | B65H 75/06 |

* cited by examiner

TV CABLE ORGANIZER

CROSS-REFERENCE TO PRIOR APPLICATIONS

This application is a national Stage Patent Application of PCT International Patent Application No. PCT/KR2017/002683, filed on Mar. 13, 2017 under 35 U.S.C. § 371, which claims priority of Korean Patent Application No. 10-2016-0030122, filed on Mar. 14, 2016, which are all hereby incorporated by reference in their entirety.

TECHNICAL FIELD

The present invention relates to a TV cable organization device, and particularly, to a TV cable organization device, which can neatly organize cables such as power cables and signal cables of a TV and various peripheral devices connected to the TV by winding the cables behind the TV.

BACKGROUND ART

As LCD, LED and PDP TVs are developed and distributed passing the era of cathode-ray tube TV, TVs are promptly increased in size and provided with input and output terminals of various specifications to receive and play back video and audio signals transmitted from a game console, a set-top box, a video player, a smartphone or the like, not simply viewing a program transmitted from a broadcasting station.

Furthermore, TVs are diversely utilized, such as directly connecting to the Internet and doing Internet searches or streaming videos or music through the Internet.

TVs are combined with diverse peripheral devices and utilized for various purposes recently as described above, and there is a problem in that the outer appearance is spoiled as the power cables and signal cables of diverse peripheral devices including the TV are complicatedly and dizzily tangled around the TV, and it is difficult to clean the area since dusts are piled up around the tangled cables.

DISCLOSURE OF INVENTION

Technical Problem

Therefore, the present invention has been made in view of the above problems, and it is an object of the present invention to provide a TV cable organization device, which can neatly organize cables such as power cables and signal cables of a TV and diverse peripheral devices connected to the TV by winding the cables behind the TV.

Technical Solution

To accomplish the above object, according to one aspect of the present invention, there is provided a TV cable organization device including: a pair of side frames formed to be spaced apart from each other by a predetermined distance; connection bars for horizontally connecting the side frames at predetermined intervals; and a power strip fastening panel fastened to one of the side frames to fasten and fix a power strip, to neatly organize cables of a TV and peripheral devices connected to the TV by winding the cables.

At this point, the TV cable organization device may further comprise a fastening means for fastening the side frames on a wall behind the TV.

In addition, it is preferable that a center frame is installed between the side frames in a direction same as that of the side frames so that the TV cable organization device may not be broken by an external impact.

In addition, it is preferable that the side frames are shaped to have a perforated core and support bars for connecting edges are configured inside the side frames to wind and organize more cables.

In addition, it is preferable that a shelf provided with a storage groove therein is installed under the TV cable organization device to store the peripheral devices connected to the TV therein.

In addition, it is preferable that the TV cable organization device is fastened to a height adjustment device installed on a base, to freely adjust height of the TV cable organization device.

At this point, the height adjustment device includes: a first leg fastened to the base and having a fixing hole formed at an end portion, a second leg having holes formed at predetermined intervals, an end portion of which is fastened to the TV cable organization device and inserted into the first leg; and a fixing bolt inserted into the fixing hole of the first leg and a hole of the second leg to fix the second leg.

According to another aspect of the present invention, there is provided a TV cable organization device comprising: a pair of side frames formed to be spaced apart from each other by a predetermined distance; a power strip fastening panel fastened to the side frame to fasten and fix a power strip; a predetermined number of support bars protruded toward an outside of the side frames; connection bars for vertically connecting end portions of the support bars; and a VESA mount for fastening the side frames to VESA holes formed on a back panel of a TV.

At this point, the VESA mount includes: an adapter fastened to the VESA holes of the TV; a rib, both ends of which are fastened to the side frames, provided with a fastening hole fastened to cable organization device fastening holes of the adapter; a coupler fastened to the adapter to be positioned under the rib; and a mount panel fastened to the coupler.

In addition, it is preferable that the TV cable organization device further comprises connection bars for connecting the side frames.

Advantageous Effects

According to the TV cable organization device of the present invention configured as described above, since cables such as power cables and signal cables of a TV and various peripheral devices connected to the TV are neatly organized by winding the cables around the TV cable organization device installed behind the TV, the appearance looks clean as the cable are not seen, and since the cables are wound after being classified by the TV and the peripheral devices connected to the TV, the cables may be prevented from being tangled with each other when the peripheral devices are installed and uninstalled.

DESCRIPTION OF SYMBOLS

Figure 1:
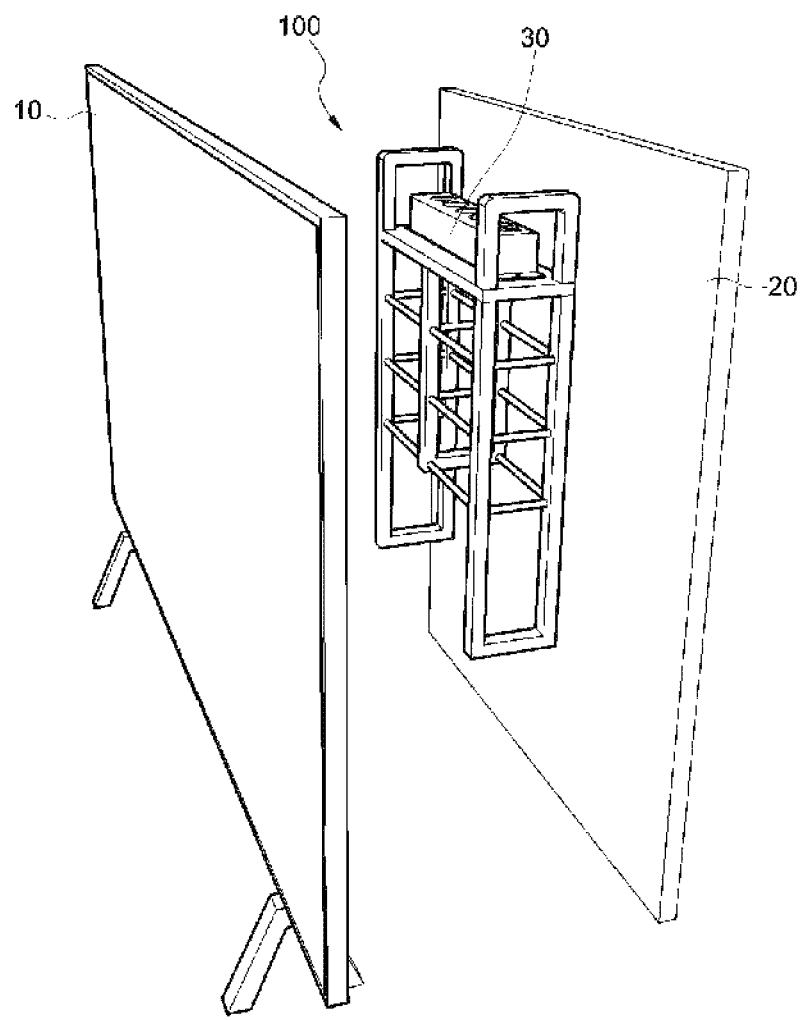
FIG. 1 is a use state view showing a use state of a cable organization device according to a first embodiment of the present invention.

10: TV
11: VESA hole
20: wall
30: power strip
100: TV cable organization device
101: side frame
102: center frame
103: connection bar
104: support bar
105: power strip fastening plate
106: auxiliary connection bar
107: rib
108: fastening hole
110: shelf
111: storage groove
112: leg
120: clock
130: height adjustment device
131: base
132: first leg

DESCRIPTION OF SYMBOLS

133: fixing hole
134: fixing bolt
135: second leg
136: hole
140: VESA mount
141: adapter
142: cable organization device fastening hole
143: coupler
144: mount panel
150: monitor arm
151: coupling plate

BEST MODE FOR CARRYING OUT THE INVENTION

The present invention will be hereafter described in detail, with reference to the preferred embodiments of the present invention and the accompanying drawings, and it will be described assuming that elements having like functions will be denoted by like reference numerals.

When it is referred that an element "includes" another element in the detailed description or claims of the present invention, it should be understood that this is not interpreted as being limited to only one corresponding element as far as an opposed description is not specially specified, but may further include other elements.

Recently, both the display panel on the front side and the back panel on the rear side of a TV 10 are manufactured in a flat shape as shown in FIG. 1.

In the present invention, as a cable organization device is installed behind the TV 10, messy cables are organized not to be seen from the front of the TV 10.

First Embodiment

A TV cable organization device 100 according to a first embodiment of the present invention is configured to be fastened on a wall 20 behind a TV 10 to neatly organize cables such as power cables and signal cables of the TV 10 and various peripheral devices connected to the TV 10 by winding the cables.

In addition, the TV cable organization device 100 is configured to supply power to the TV 10 and the peripheral devices, in addition to organizing the cables, by fastening a power strip 30 to the TV cable organization device 100.

Figure 2:
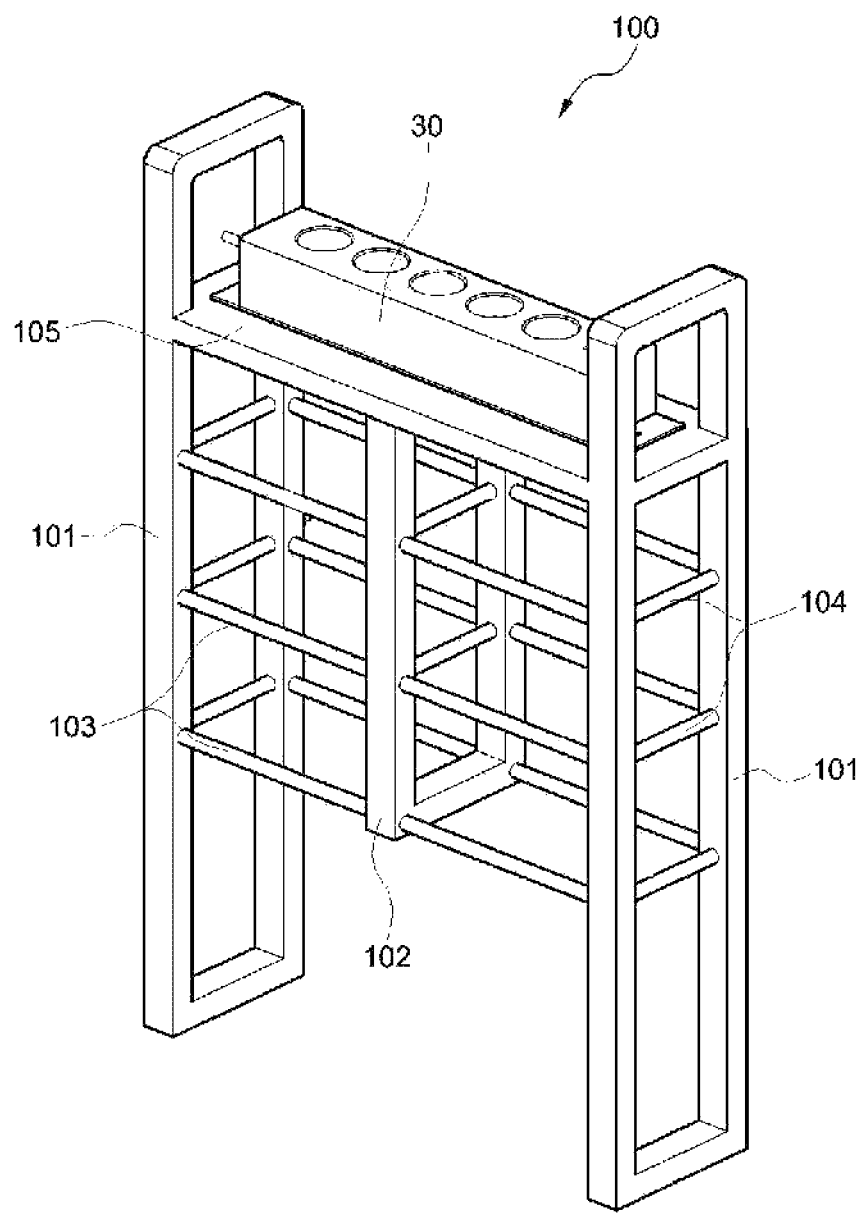
FIG. 2 is a perspective view showing a cable organization device according to a first embodiment of the present invention.

As shown in FIG. 2, the TV cable organization device 100 according to a first embodiment of the present invention is configured to include a pair of side frames 101 formed to be spaced apart from each other by a predetermined distance, and connection bars 103 formed at predetermined intervals to horizontally connect the side frames, to neatly organize cables of a TV 10 and peripheral devices by winding the cables around the connection bars 103.

At this point, it is preferable that a power strip fastening panel 105 is formed on the top of the TV cable organization device 100 and a power strip 30 is fastened and fixed to the power strip fastening panel 105 to supply power to the TV 10 and the peripheral devices.

In addition, it is preferable that a center frame 102 is installed between the pair of side frames 101 as shown in FIG. 2 to reinforce the strength of the TV cable organization device 100 not to be broken by an external force and to separately wind the cables around the connection bars 103 for each of the TV and the peripheral devices by separating the connection bars 103.

In addition, the side frames 101 and the center frame 102 are shaped to have a perforated core, and the TV cable organization device 100 may be configured to wind more cables by installing support bars 104 for connecting the edges so that the cables may be organized by winding the cables around the support bars 104.

The TV cable organization device 100 configured as described above is fastened on the wall 20 behind the TV 10 as shown in FIG. 1, and known fastening means such as a bolt or the like are configured on the side frames 101, and the TV cable organization device 100 is fastened and fixed on the wall 20 using the fastening means.

Second Embodiment

A TV cable organization device 100 according to a second embodiment of the present invention is configured not to be fastened on the wall, but to be installed to be upright behind the TV 10.

Figure 3:
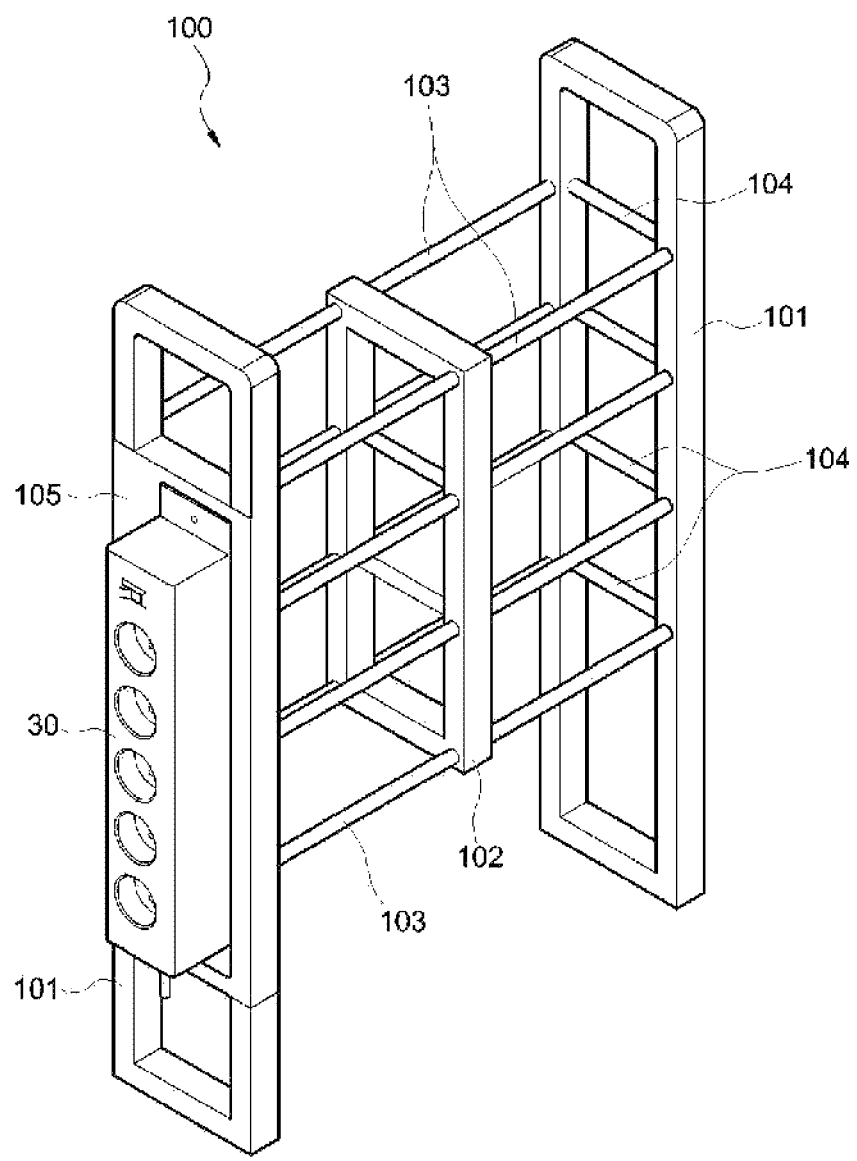
FIG. 3 is a perspective view showing a cable organization device according to a second embodiment of the present invention.
Figure 4:
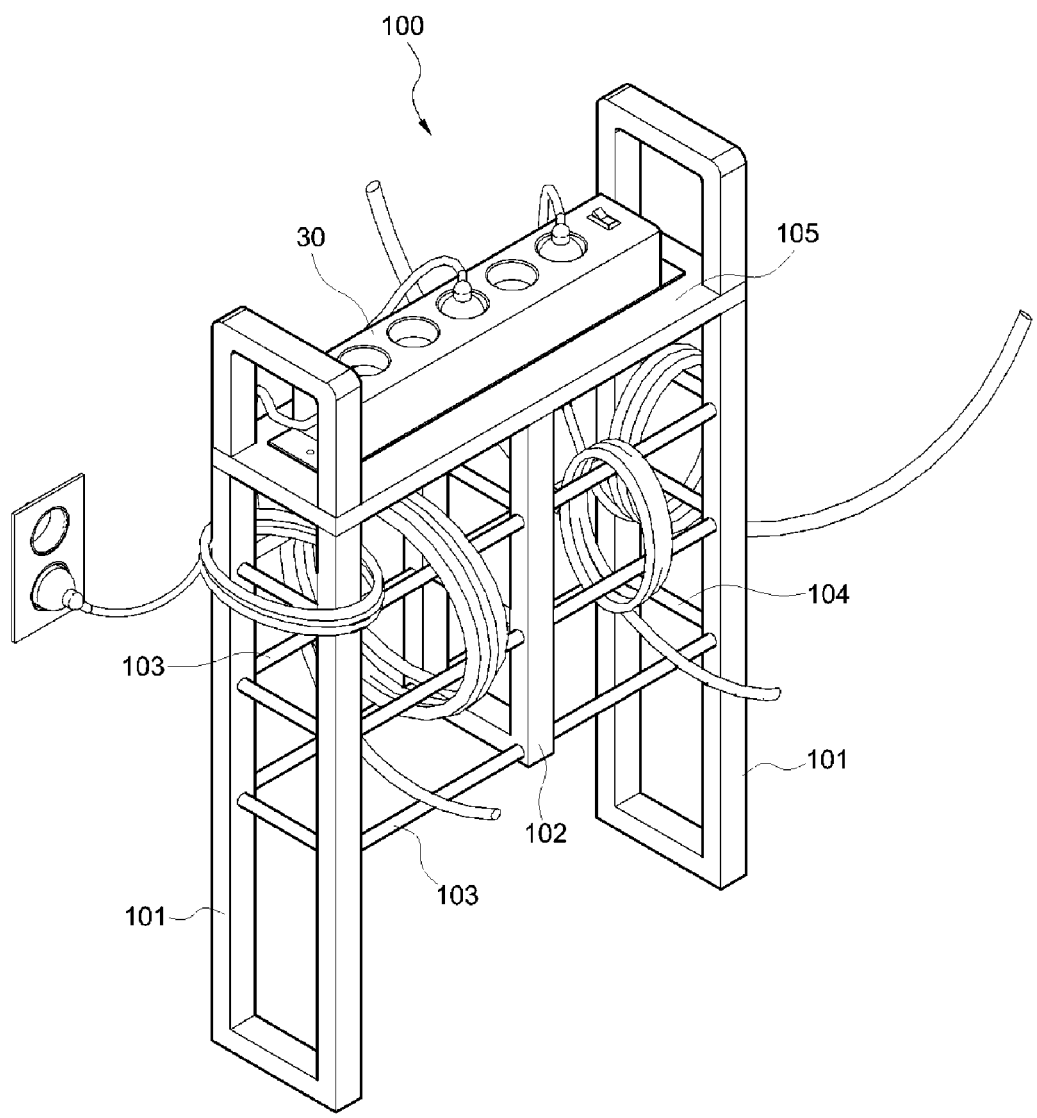
FIG. 4 is a use state view showing a use state of a cable organization device according to a second embodiment of the present invention.

As shown in FIGS. 3 and 4, the TV cable organization device 100 according to a second embodiment of the present invention is configured to include a pair of side frames 101 formed to be spaced apart from each other by a predetermined distance, connection bars 103 formed at predetermined intervals to horizontally connect the side frames, and a power strip fastening panel 105 formed on a side surface of a side frame 101 to fasten and fix a power strip 30, to neatly organize cables of a TV 10 and peripheral devices by winding the cables around the connection bars 103.

Although the power strip fastening panel 105 is formed on one side of the side frame 101 in the second embodiment of the present invention shown in FIG. 3, the power strip fastening panel 105 may be formed on the top of the TV cable organization device 100 as shown in FIG. 2.

That is, although the side frames 101 are fastened and fixed on the wall in the first embodiment described above, the TV cable organization device 100 is configured to be installed upright behind the TV 10 in the second embodiment, and the second embodiment is the same as the first embodiment in configuration, except the fastening means of the first embodiment for fastening the TV cable organization device 100 on the wall.

Third Embodiment

In a third embodiment of the present invention, a shelf 110 is configured under the TV cable organization device 100.

A TV cable organization device 100 according to a third embodiment of the present invention is configured to include a pair of side frames 101 formed to be spaced apart from each other by a predetermined distance, and connection bars 103 formed at predetermined intervals to horizontally connect the side frames, to neatly organize cables of a TV 10 and peripheral devices by winding the cables around the connection bars 103.

In addition, a center frame 102 may be installed between the pair of side frames 101, and the side frames 101 and the center frame 102 may be shaped to have a perforated core, and support bars 104 for connecting edges may be installed.

In addition, a shelf 110 provided with a storage groove 111 therein is installed under the side frames 101, and peripheral devices connected to the TV 10, such as a set-top box, a DVD player and the like, are stored in the storage groove 111 of the shelf 110.

Figure 7:
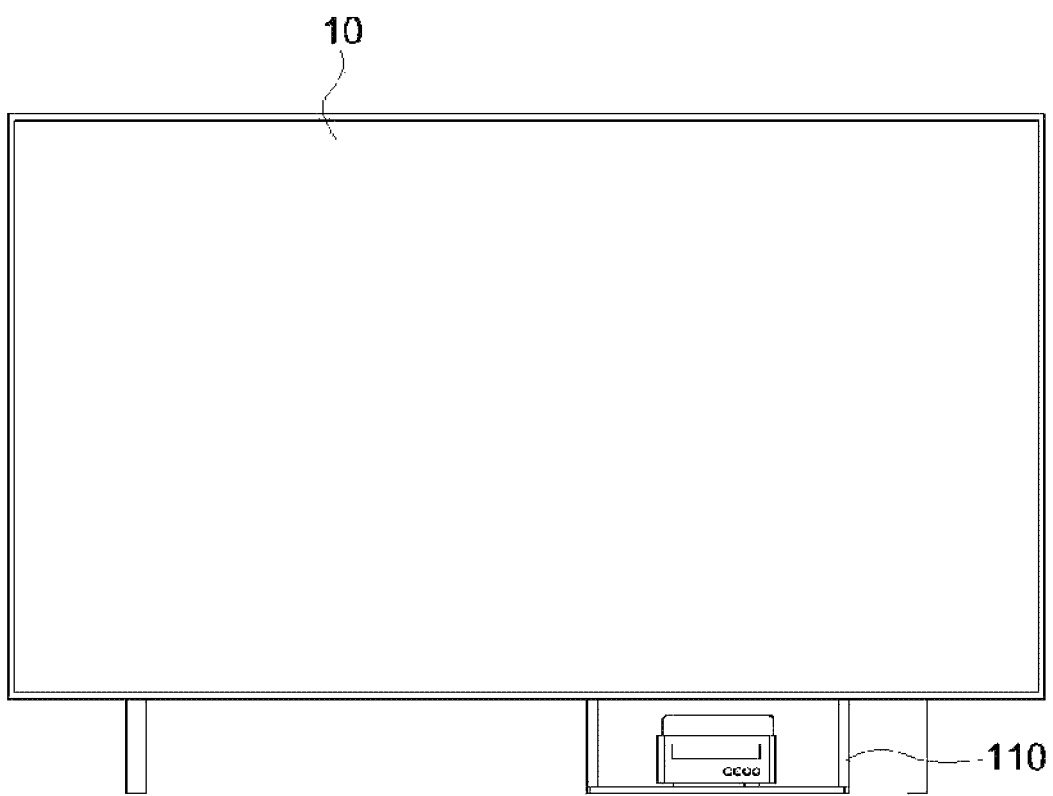
FIG. 7 is a view showing a third embodiment visible from the front of a TV.

If the shelf 110 is installed under the TV cable organization device 100 as described above, the TV cable organization device 100 is not seen from the front of the TV 10 as shown in FIG. 7, and only the shelf 110 and peripheral devices stored on the shelf 10 are seen, and thus appearance of the TV 10 is neatly finished.

Figure 5:
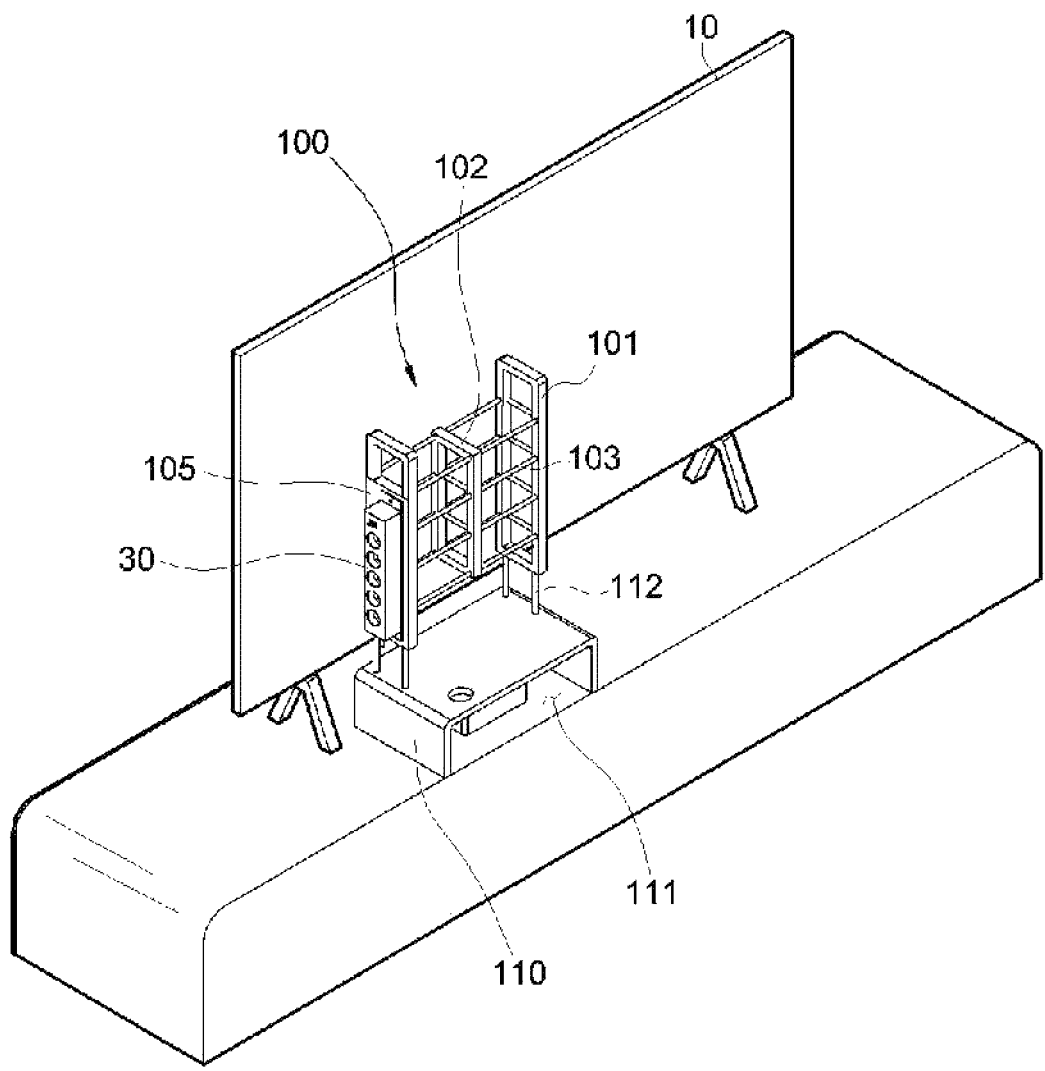
FIG. 5 is a use state view showing a use state of a cable organization device according to a third embodiment of the present invention.

In addition, the TV cable organization device 100 is fastened on the top of the shelf 110, and the TV cable organization device 100 may be seen together with the shelf 110 from the front of the TV 10, and to prevent this problem, legs 112 may be installed between the side frames 101 and the shelf 110 as shown in FIG. 5 to configure the TV cable organization device 100 to be positioned further higher.

Figure 6:
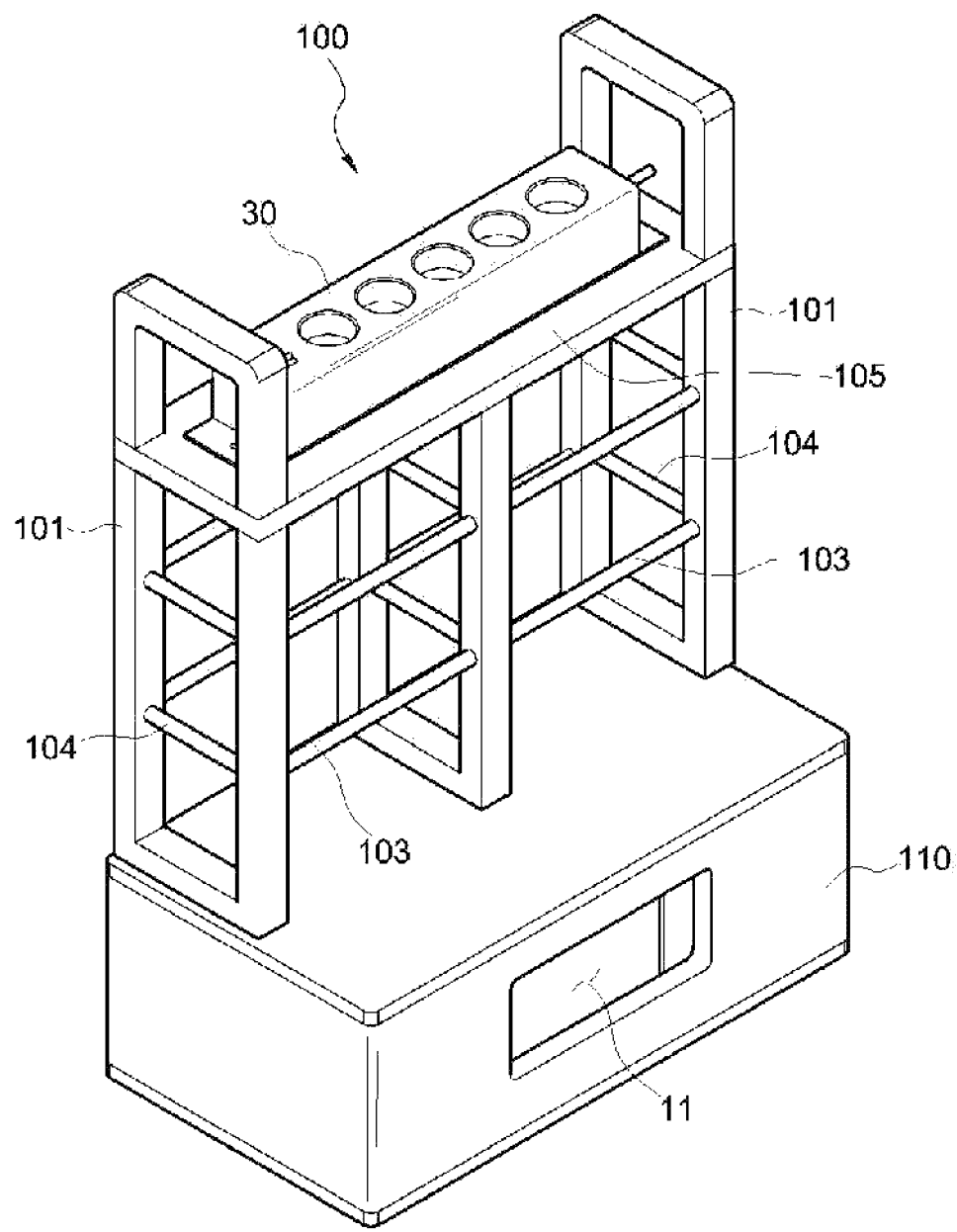
FIG. 6 is a perspective view showing a cable organization device according to a third embodiment of the present invention.

In addition, it is shown in FIG. 5 that a power strip fastening panel 105 is formed on the outer surface of the side frame 101 to fasten and fix a power strip 30, whereas it is shown in FIG. 6 that the power strip fastening panel 105 is formed on the top of the TV cable organization device 100 to fasten and fix a power strip 30. Like this, the power strip fastening panel 105 may be formed on the top or side surface of the TV cable organization device 100.

Fourth Embodiment

A part for winding cables in a fourth embodiment of the present invention is configured to be the same as that of the third embodiment described above.

Figure 8:
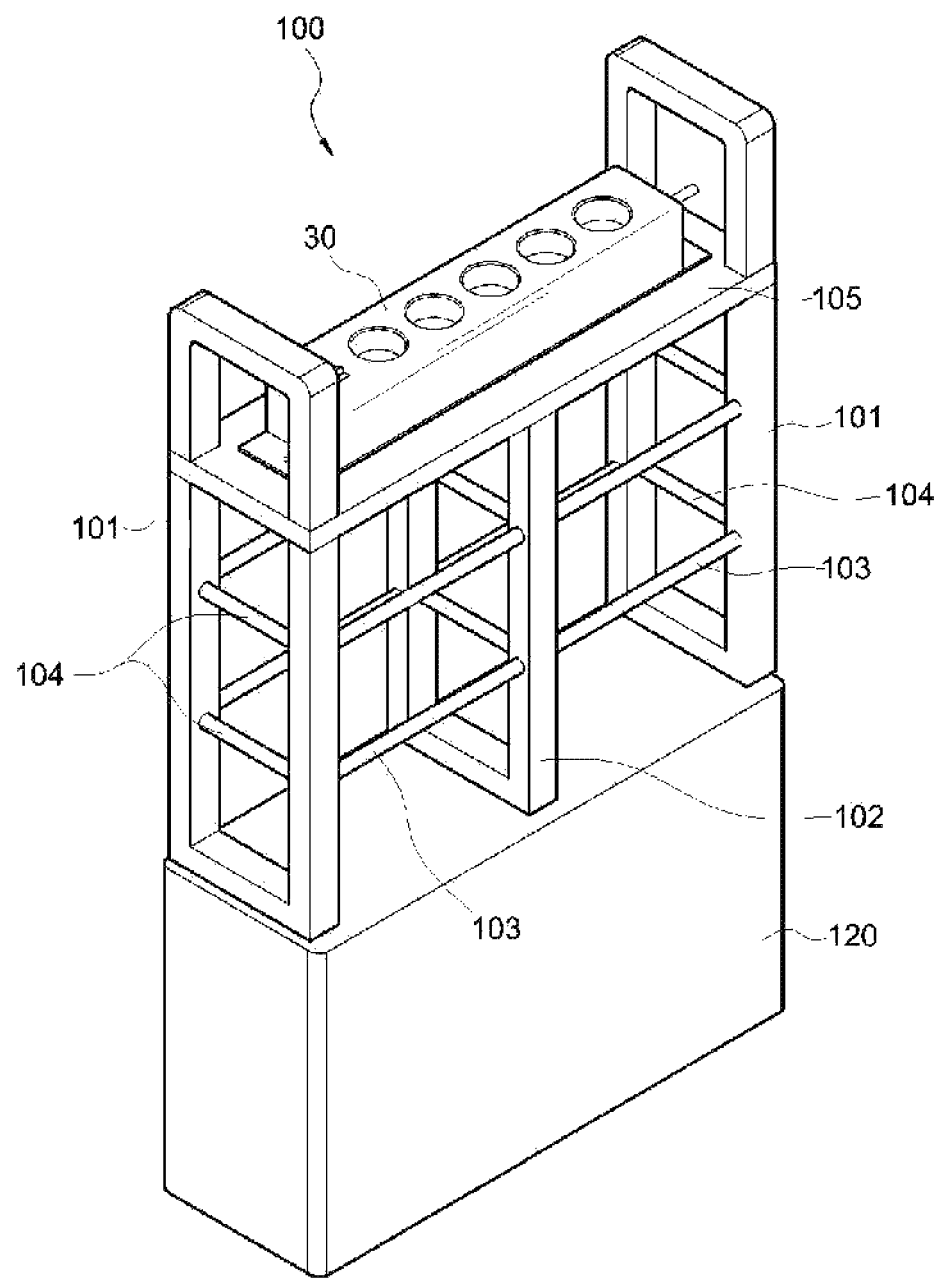
FIG. 8 is a perspective view showing a cable organization device according to a fourth embodiment of the present invention.
Figure 9:
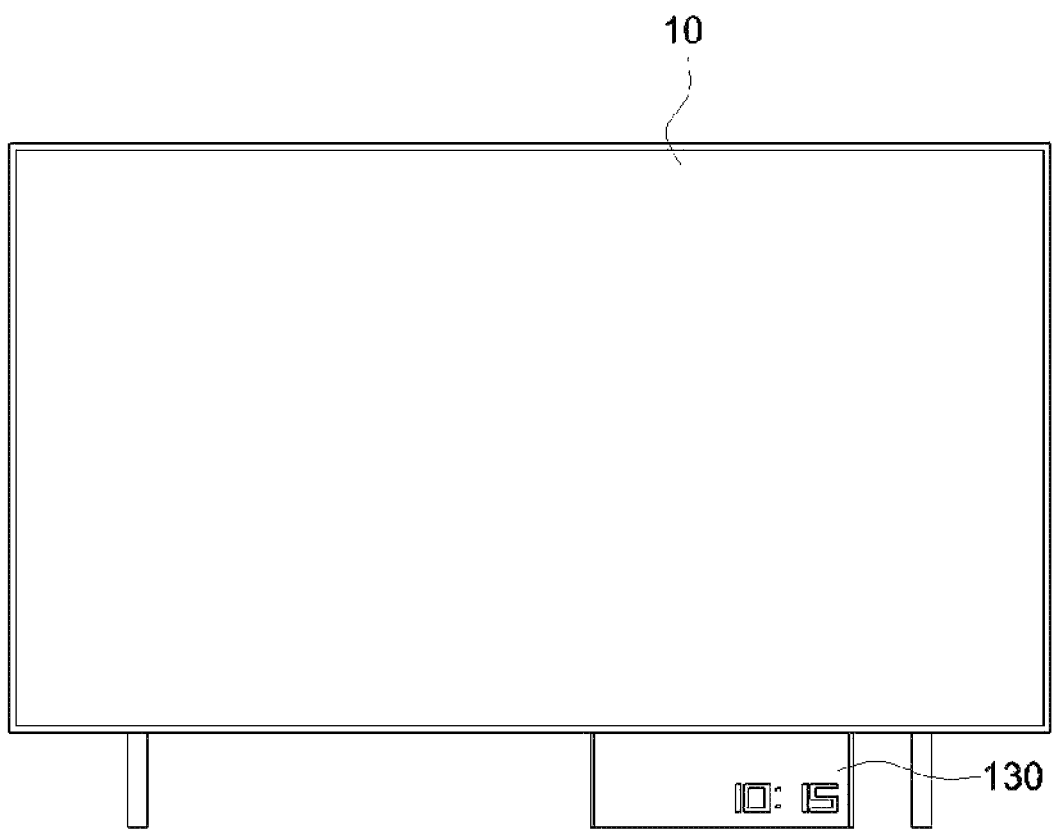
FIG. 9 is a view showing a fourth embodiment visible from the front of a TV.

Contrarily, since a clock 120, not the shelf 110, is installed under the TV cable organization device 100 as shown in FIG. 8, seeing from the front of the TV 10, only the clock 120 is exposed under the TV 10 as shown in FIG. 9, and appearance of the TV 10 is neatly finished.

Although it is described in the embodiment described above that the clock 120 is installed under the TV cable organization device 100, a thermometer or a hygrometer, as well as the clock, may be installed.

Fifth Embodiment

Figure 10:
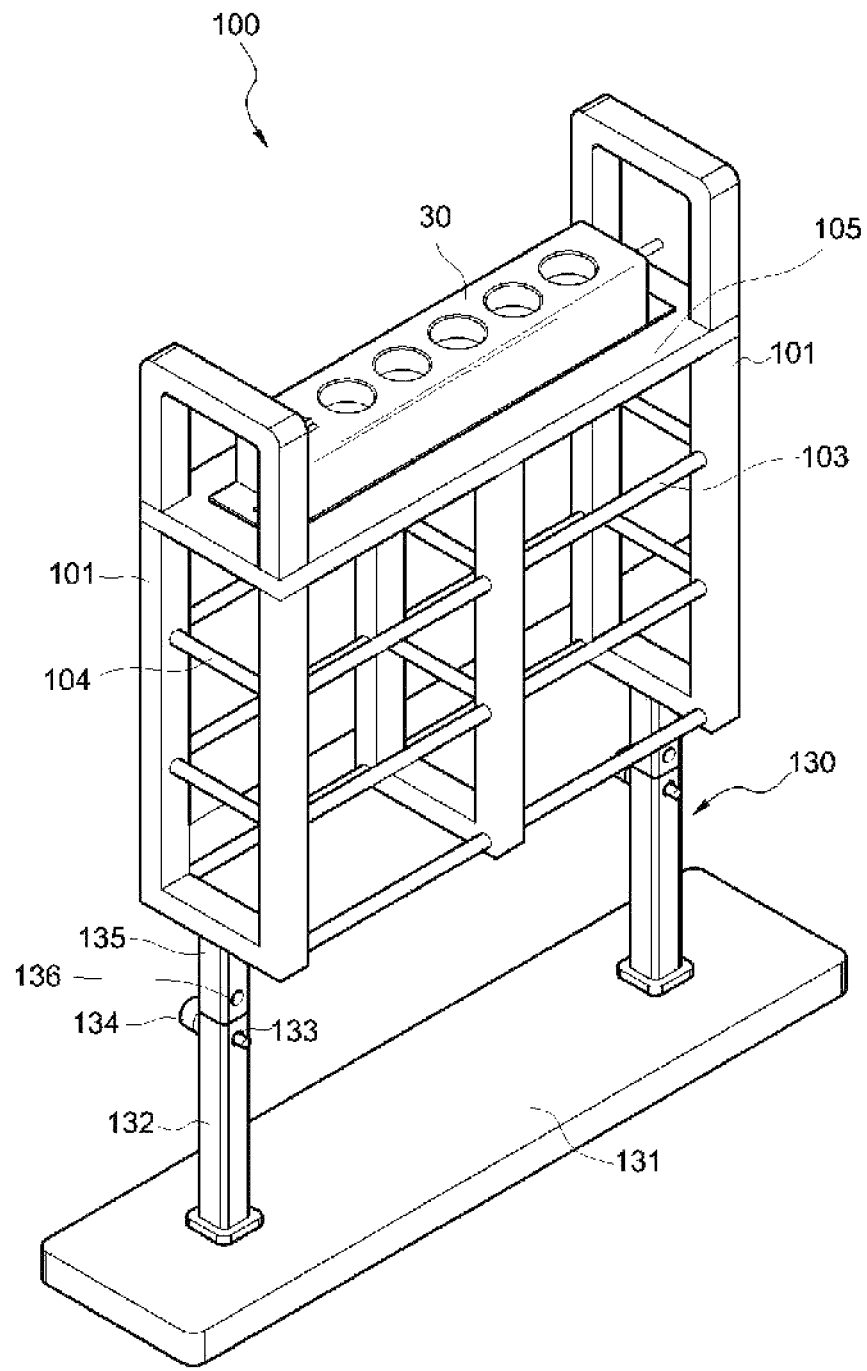
FIG. 10 is a perspective view showing a cable organization device according to a fifth embodiment of the present invention.

As a height adjustment device 130 is configured under the TV cable organization device 100 as shown in FIG. 10 of a fifth embodiment, the height of the TV cable organization device 100 may be freely adjusted.

As shown in FIG. 10, the TV cable organization device 100 according to a fifth embodiment of the present invention is configured to include a pair of side frames 101 formed to be spaced apart from each other by a predetermined distance, connection bars 103 formed at predetermined intervals to horizontally connect the side frames, and a power strip fastening panel 105 formed on the top of the TV cable organization device 100.

In addition, a center frame 102 is installed between the pair of side frames 101, and the side frames 101 and the center frame 102 are shaped to have a perforated core, and support bars 104 for connecting edges may be installed inside the side frames 101.

In addition, legs provided with a height adjustment device 130 are formed on the bottom of the side frames 101, and the legs are fastened to a base 131 of a plate shape.

The fifth embodiment of the present invention configured as described above may freely adjust the height of the TV cable organization device 100 through the height adjustment devices 130 of the legs, and the height adjustment device 130 is configured as described below.

A first leg 132 having a fixing hole 133 is fastened and fixed on the top of the base 131, and a second leg 135 having holes 136 formed at predetermined intervals is fastened and fixed on the bottom of the side frame 101.

Adjustment of the height of the TV cable organization device 100 is accomplished by inserting the second legs 135 into the first legs 132 of the base 131, aligning the holes 136 of the second legs 135 with the fixing holes 133 of the first legs 132 while the height of the TV cable organization device 100 has been adjusted, and inserting fixing bolts 134 into the holes 136 of the second legs 135 and the fixing holes 133 of the first legs 132.

The height of the TV cable organization device 100 can be freely adjusted using the height adjustment devices 130 configured as described below.

Sixth Embodiment

The first embodiment as described above is configured to fasten the TV cable organization device 100 on the wall, and the second to fifth embodiments are configured to put the TV cable organization device 100 upright behind the TV 10 to wind and organize cables, whereas the sixth embodiment is configured to integrate the TV cable organization device 100 with the TV 10 by fastening the TV cable organization device 100 to VESA holes 11 formed on the back panel of the TV 10.

Generally, a TV is provided with legs installed on the bottom so that the TV may be put on a TV stand, or the TV is hung on a wall to be used in the form of a wall-mounted TV.

A TV is fastened and fixed on the wall using a separate bracket to hang the TV on the wall, and to fasten the bracket to the TV, VESA holes 11 are formed on the back panel of the TV when the TV is manufactured.

The VESA hole 11 is the abbreviation of Video Electronics Standards Association hole, which is an installation interface standard for installing a stand or a cradle on a display and refers to holes for installing four screws in the back panel.

As shown in FIGS. 11 to 14, a TV cable organization device 100 according to the sixth embodiment of the present invention is configured to include side frames 101 fastened on both sides of a power strip fastening panel 105 to which a power strip 30 is fastened and fixed, a predetermined number of support bars 104 formed on the outer surface of the side frames 101 to be protruded from the side frames 101, and connection bars 103 for connecting the end portions of the support bars 104, to neatly organize cables by winding the cables using the support bars 104 and the connection bars 103.

The TV cable organization device 100 configured as described above is fastened to the VESA holes 11 formed on the back panel of the TV 10 through a VESA mount 140.

Figure 12:
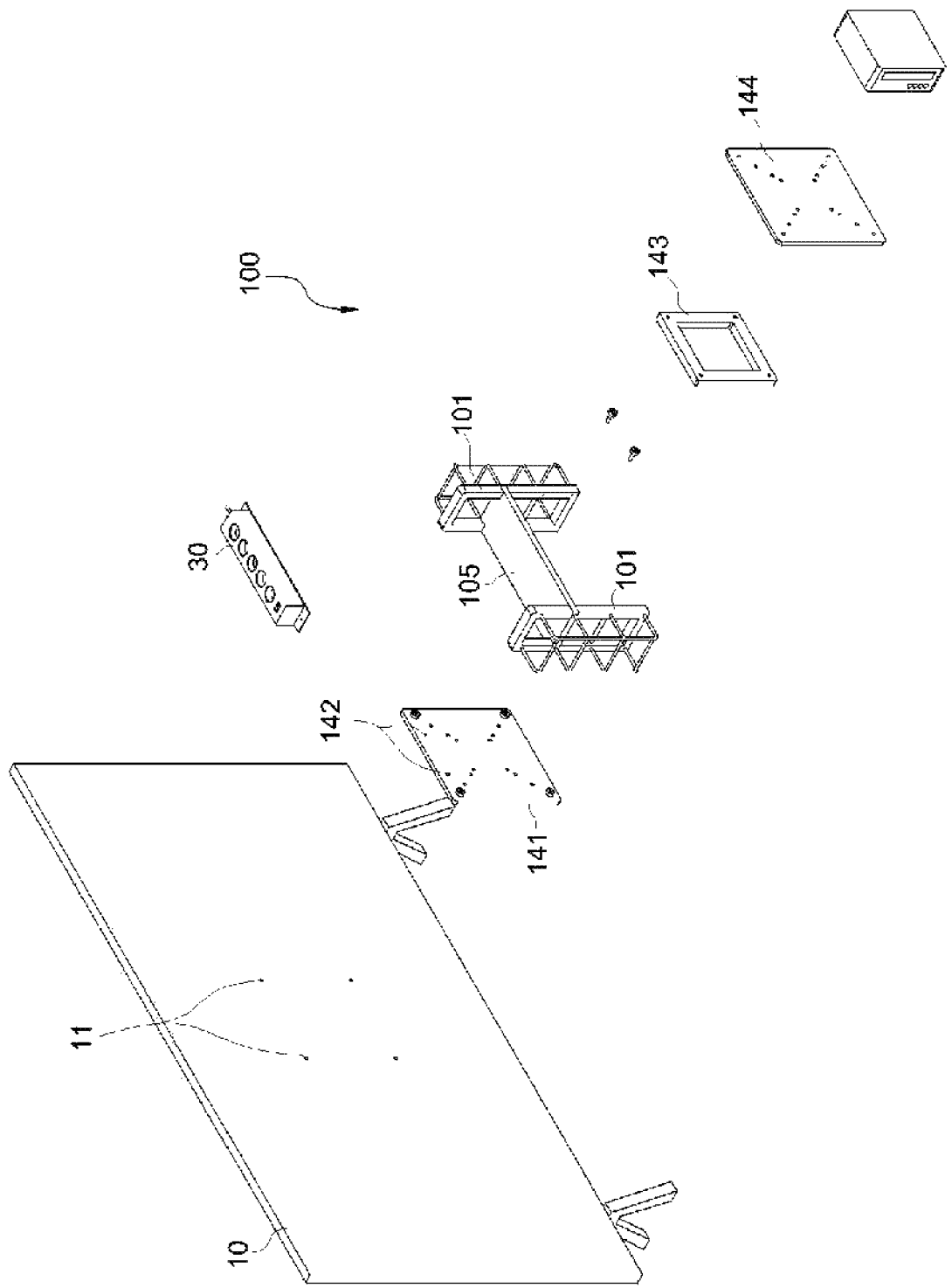
FIG. 12 is an exploded perspective view showing a cable organization device according to a sixth embodiment of the present invention.

The VESA mount 140 is configured of an adapter 141, a coupler 143 and a mount panel 144 as shown in FIG. 12 and fastens and fixes the TV cable organization device 100 to the VESA holes 11 of the TV 10.

As shown in FIG. 12, the adapter 141 of a panel shape is fastened to the VESA holes 11 of the TV 10 using bolts. Then, the TV cable organization device 100 is fastened to cable organization device fastening holes 142 formed on the adapter 141.

Figure 13:
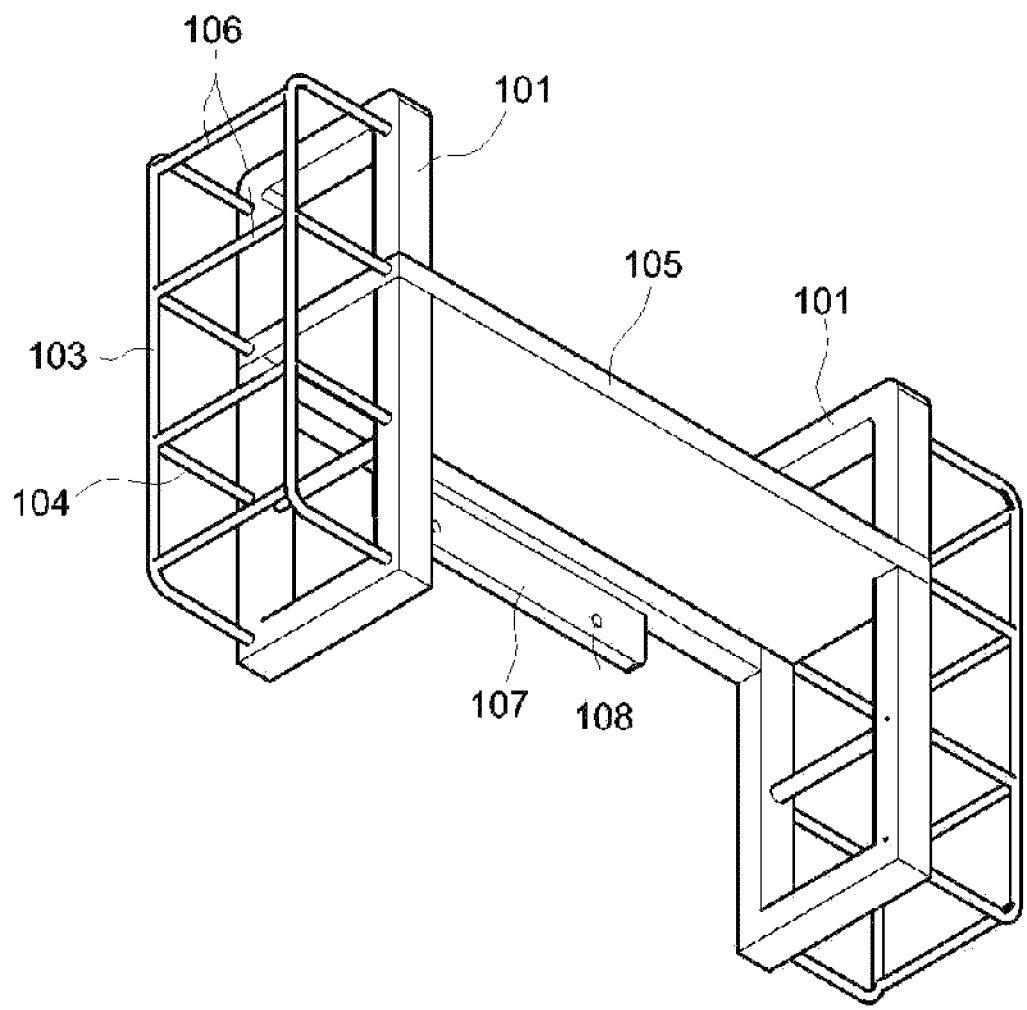
FIG. 13 is a bottom surface perspective view showing the bottom surface of a cable organization unit according to a sixth embodiment of the present invention.

As shown in FIG. 13, a rib 107 protruded downward is formed on the bottom of the power strip fastening panel 105, and fastening holes 108 are formed on the rib 107. The TV cable organization device 100 is fastened and fixed to the adapter 141 using bolts after aligning the fastening holes 108 with the cable organization device fastening holes 142 of the adapter 141.

In addition, the coupler 143 is fastened to the adapter 141 using bolts, and the mount panel 144 is fastened to the coupler 143.

Figure 14:
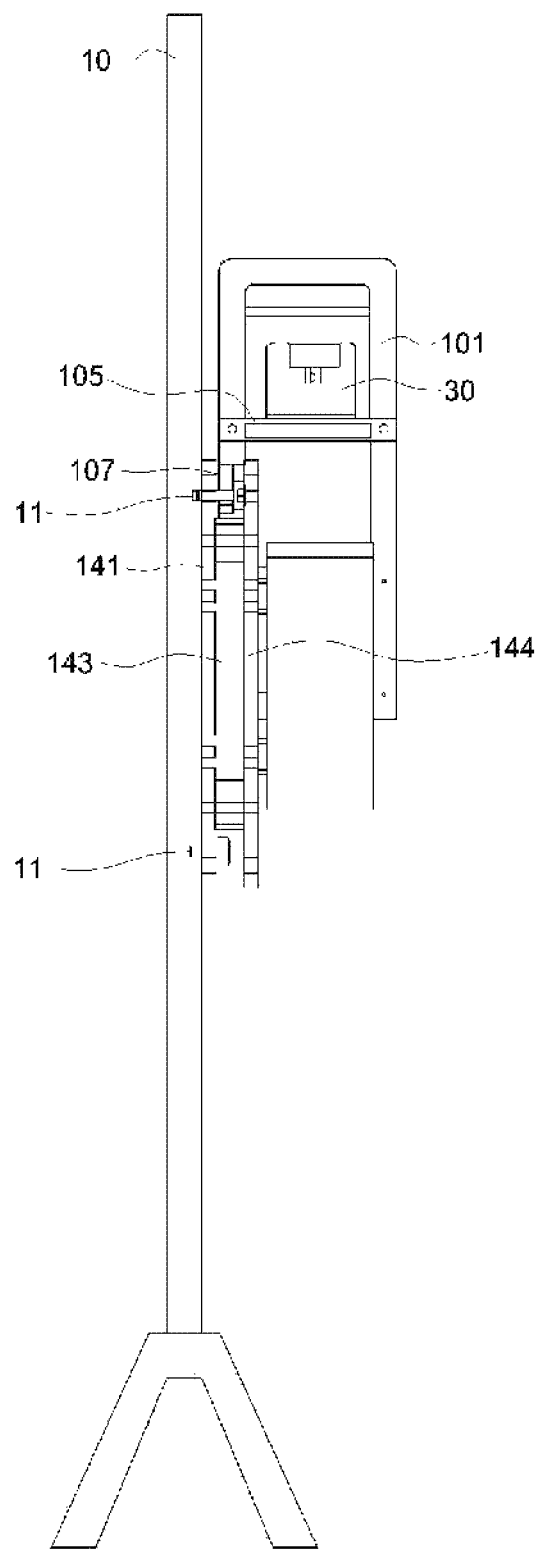
FIG. 14 is a cross-sectional view showing a cable organization unit according to a sixth embodiment of the present invention.

The rib 107 of the TV cable organization device 100 is fastened to the cable organization device fastening holes 142 of the adapter 141, and the adapter 141 and the mount panel 144 is horizontally coupled as shown in FIG. 14 as the mount panel 144 is fastened after the coupler 143 of a thickness the same as that of the rib 107 is fastened under the rib 107.

Figure 11:
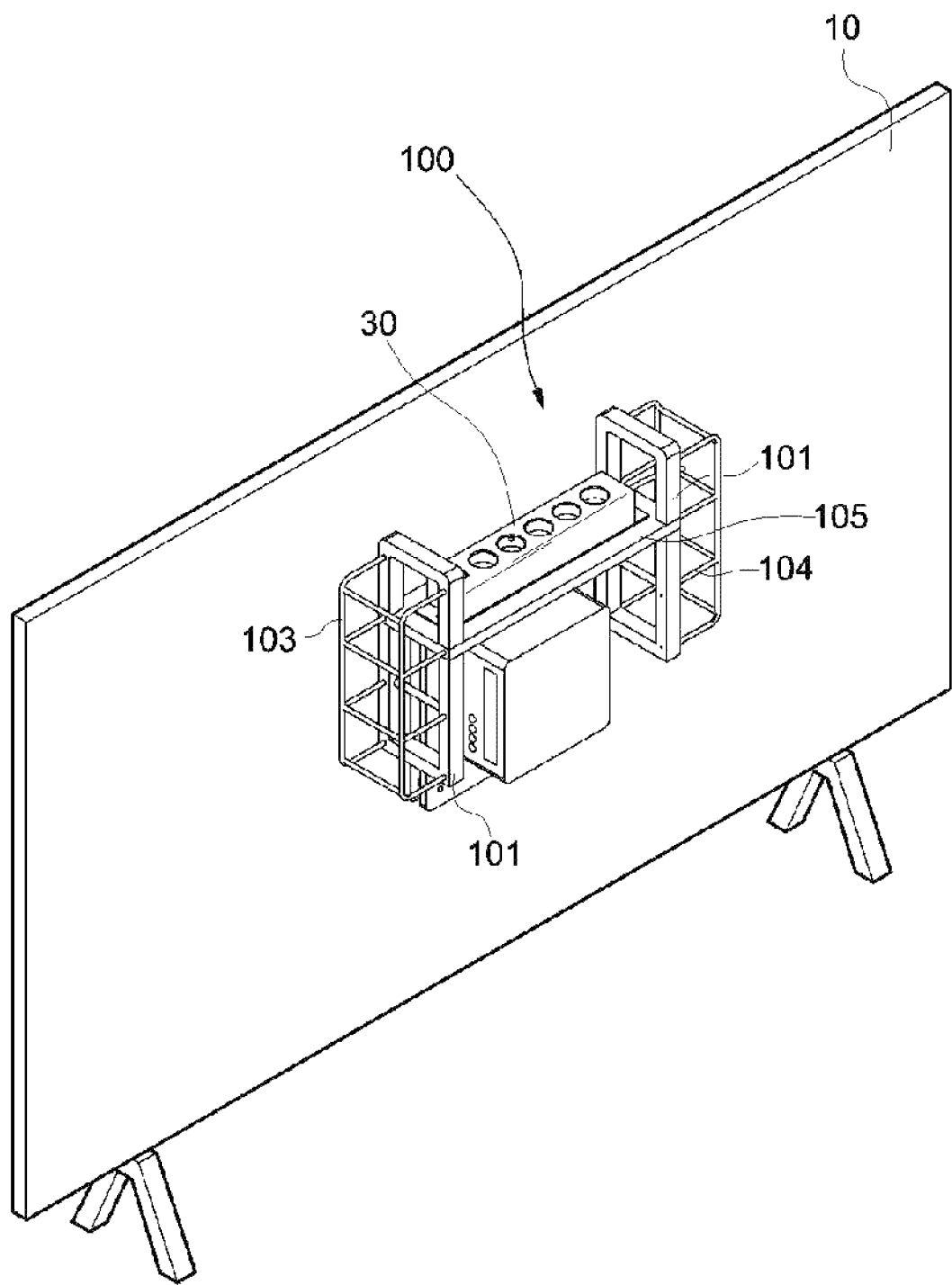
FIG. 11 is a use state view showing a use state of a cable organization device according to a sixth embodiment of the present invention.

The TV cable organization device 100 is configured to fasten and fix a peripheral device connected to the TV 10 to the mount panel 144 as shown in FIGS. 11 and 12.

Figure 15:
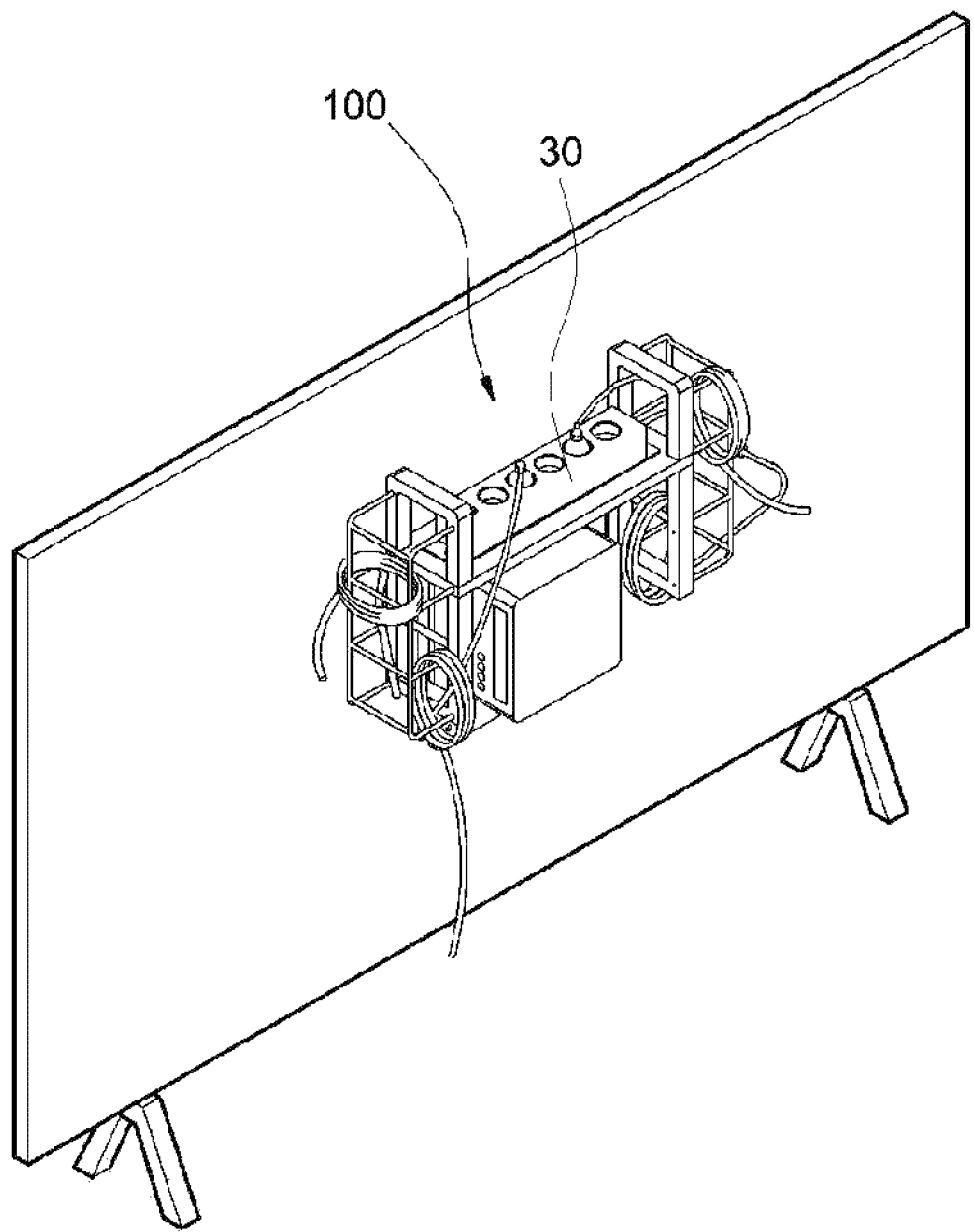
FIG. 15 is a use state view showing a use state of a cable organization unit according to a sixth embodiment of the present invention.

In the sixth embodiment of the present invention configured as described above, since the TV cable organization device 100 is installed to be integrated with the TV by fastening the TV cable organization device 100 to the VESA holes 11 formed on the back panel of the TV 10 as shown in FIG. 15, various cables of the TV and peripheral devices can be neatly maintained by winding the cables around the connection bars 103, support bars 104 and auxiliary connection bars 106, and the peripheral devices connected to the TV can be fastened and fixed to the TV cable organization device 100.

Figure 16:
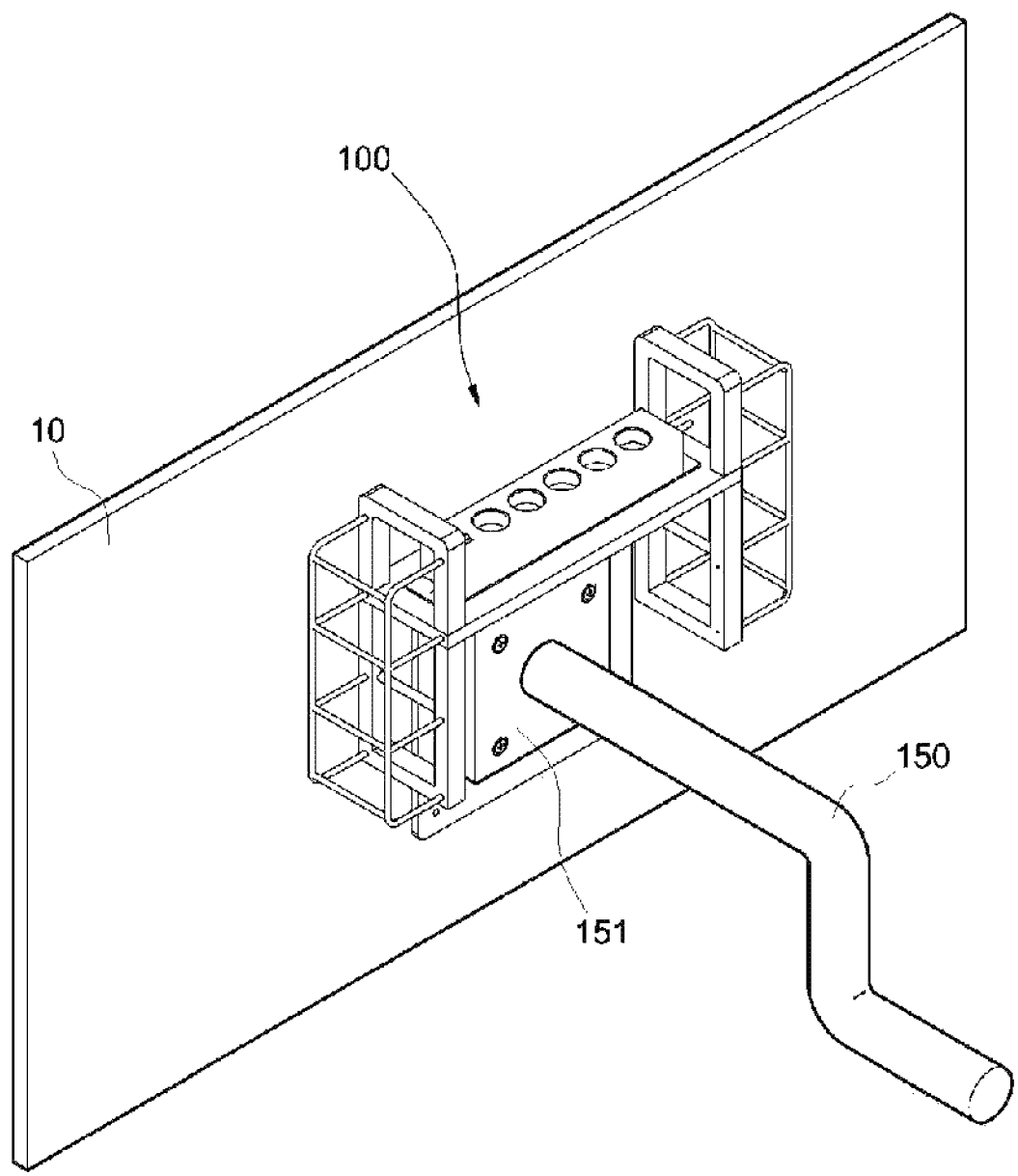
FIG. 16 is a use state view showing another use state of a cable organization device according to a sixth embodiment of the present invention.

Although it is described in FIG. 11 that peripheral devices are fastened and fixed to the mount panel 144, a fastening plate 151 of a monitor arm 150, as well as the peripheral devices, may be fastened and used on the mount panel 144 as shown in FIG. 16.

Holes of VESA specification are formed on the fastening plate 151 of a general monitor arm 150, and it is configured to form fastening holes of VESA specification on the mount panel 144 to fasten the monitor arm 150.

Seventh Embodiment

Figure 17:
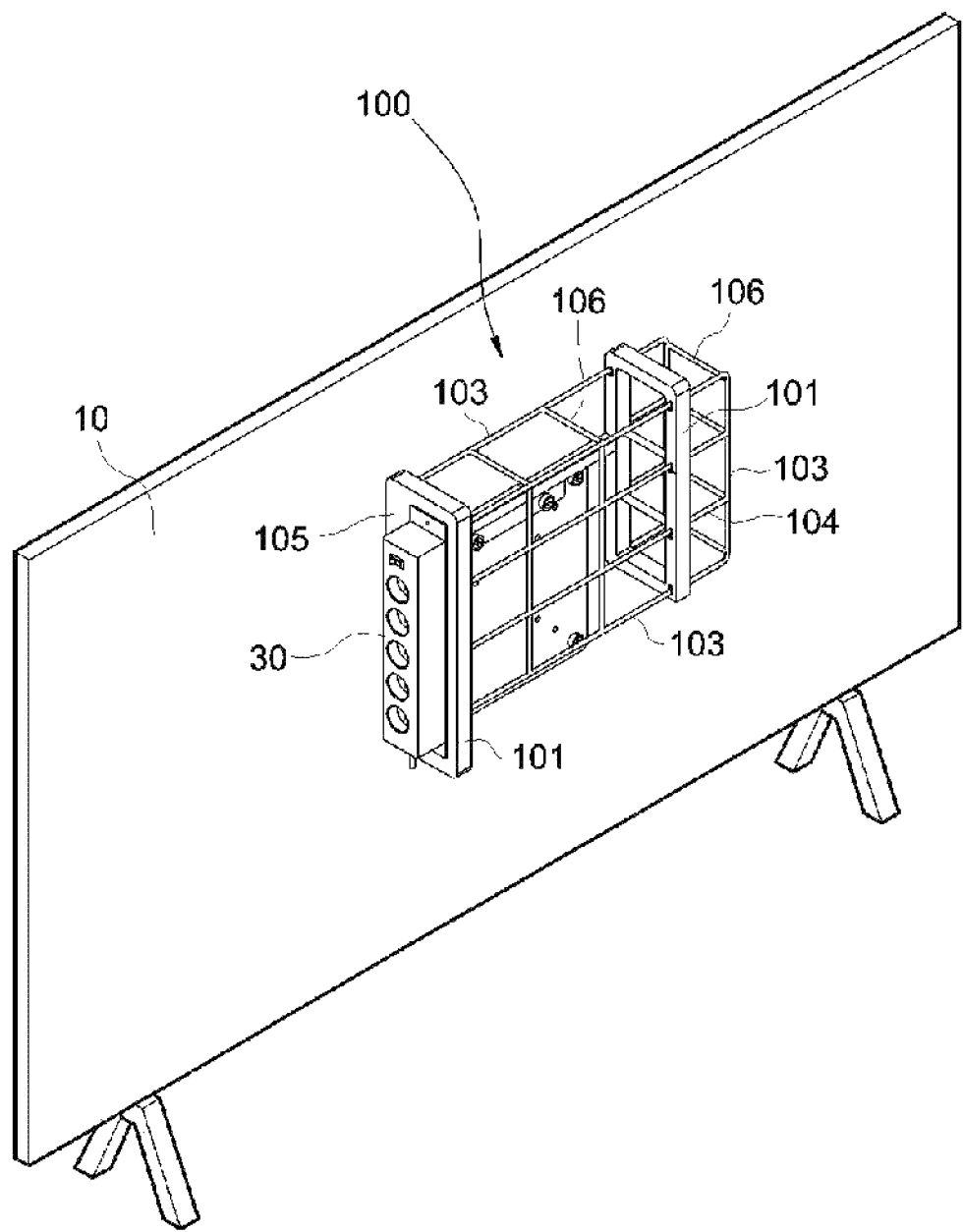
FIG. 17 is a perspective view showing a cable organization device according to a seventh embodiment of the present invention.

Although all of the connection bars 103, support bars 104 and auxiliary connection bars 106 are formed on the outer surface of the side frame 101, the TV cable organization device 100 according to a seventh embodiment is configured, as shown in FIG. 17, by forming a power strip fastening panel 105 on the outer surface of any one side frame 101 among a pair of side frames 101, forming a predetermined number of support bars 104 to be protruded on the outer surface of the other side frame 101 in a manner the same as that of the sixth embodiment, connecting the support bars 104 using vertical connection bars 103, and connecting the support bars 104 using horizontal auxiliary connection bars 106.

Figure 18:
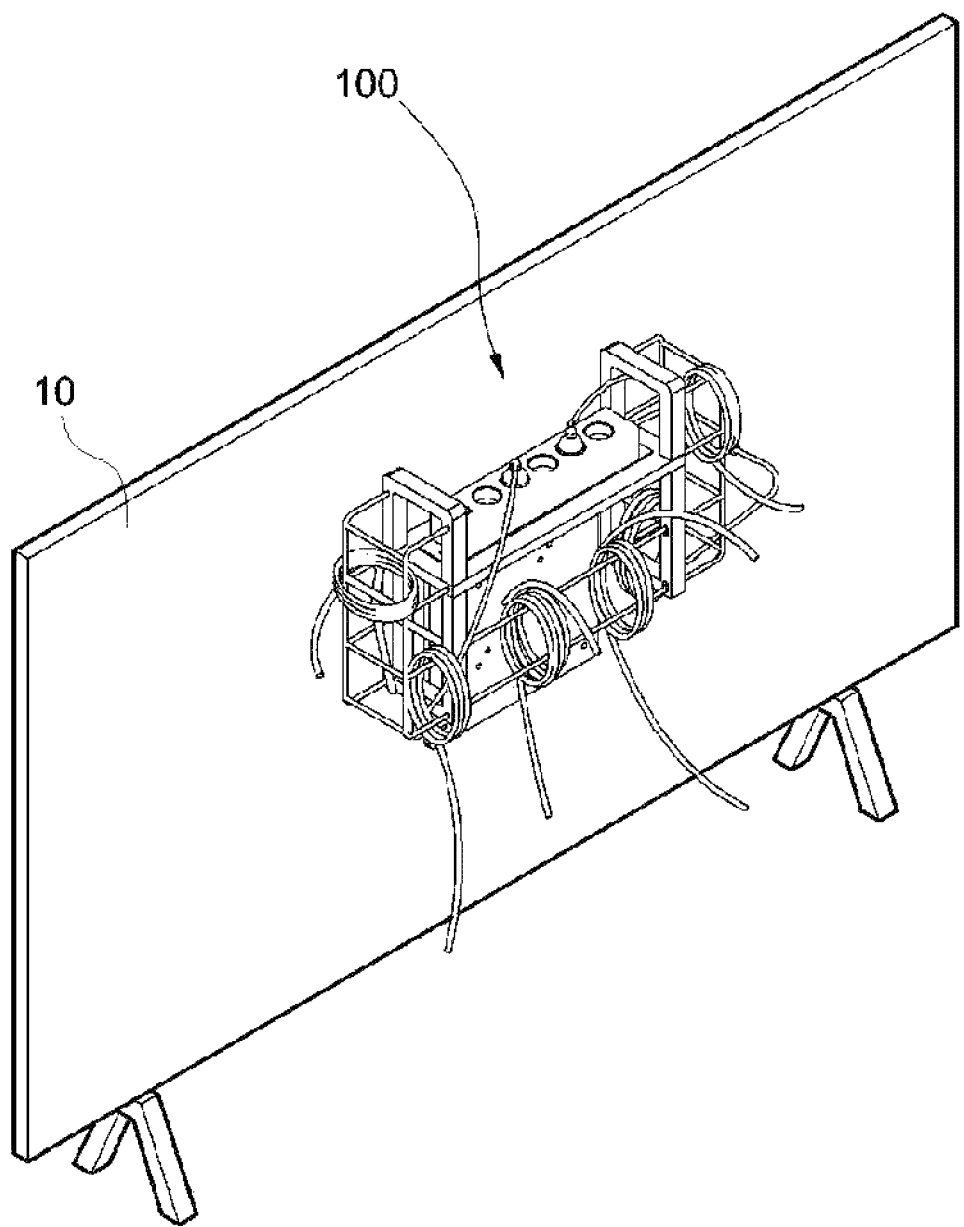
FIG. 18 is a use state view showing a use state of a cable organization device according to a seventh embodiment of the present invention.

In addition, the TV cable organization device is configured to wind and organize cables as shown in FIG. 18 by connecting the pair of side frames 101 using the connection bars 103 at predetermined intervals and connecting the connection bars 103 connecting the side frames 101 using the auxiliary connection bars 106 at predetermined intervals.

The technical spirit of the present invention has been described through several embodiments described above.

It is apparent that those skilled in the art may diversely modify or change the embodiments described above from the description of the present invention.

In addition, although it is not explicitly shown or described, it is apparent that those skilled in the art may make modifications of various diverse forms including the spirit of the present invention from the description of the present invention, and this still falls within the scope of the present invention.

The embodiments described above with reference to the accompanying drawings are described for illustrative purposes, and the scope of the present invention is not limited to the embodiments.

The invention claimed is:

1. A TV cable organization device for organizing cables of a TV and peripheral devices connected to the TV, the device comprising:
    a pair of side frames formed to be spaced apart from each other by a predetermined distance;
    connection bars for horizontally connecting the pair of side frames at predetermined intervals;
    a power strip fastening panel fastened to one of the pair of side frames and configured to fasten and fix a power strip thereto; and
    a center frame installed between the pair of side frames and arranged in a direction parallel to the pair of side frames.

2. The device according to claim 1, further comprising a fastener for fastening the pair of side frames on a wall behind the TV.

3. The device according to claim 1, wherein the pair of side frames have a perforated core, further comprising:
    a plurality of support bars for connecting edges, the plurality of support bars being disposed inside the pair of side frames.

4. The device according to claim 1, further comprising:
    a shelf provided with a storage groove therein and configured to be disposed under the TV cable organization device.

5. A TV cable organization device for organizing cables of a TV and peripheral devices connected to the TV, the device comprising:
    a pair of side frames formed to be spaced apart from each other by a predetermined distance;
    connection bars for horizontally connecting the pair of side frames at predetermined intervals; and
    a power strip fastening panel fastened to one of the pair of side frames and configured to fasten and fix a power strip thereto;
    wherein the TV cable organization device is fastened to a height adjustment device installed on a base.

6. The device according to claim 5, wherein the height adjustment device includes:
    a first leg fastened to the base and having a fixing hole formed at an end portion,
    a second leg having holes formed at predetermined intervals, an end portion of which is fastened to the TV cable organization device and inserted into the first leg; and
    a fixing bolt inserted into the fixing hole of the first leg and a hole of the second leg to fix the second leg.

7. A TV cable organization device comprising:
    a pair of side frames formed to be spaced apart from each other by a predetermined distance;
    a power strip fastening panel fastened to the side frame to fasten and fix a power strip;
    a predetermined number of support bars protruded toward an outside of the side frames;
    connection bars for vertically connecting end portions of the support bars; and
    a VESA mount for fastening the side frames to VESA holes formed on a back panel of a TV.

8. The device according to claim 7, wherein the VESA mount includes:
    an adapter fastened to the VESA holes of the TV;
    a rib, both ends of which are fastened to the side frames, provided with a fastening hole fastened to cable organization device fastening holes of the adapter;
    a coupler fastened to the adapter to be positioned under the rib; and
    a mount panel fastened to the coupler.

9. The device according to claim 7, further comprising connection bars for connecting the side frames.

* * * * *